United States Patent Office 2,722,535
Patented Nov. 1, 1955

2,722,535

4-[X-SULFAMYLANILINO]-1,X-DIHYDROXY-5 (OR 8)-NITROANTHRAQUINONE

Milton L. Hoefle, David I. Randall, and Edgar E. Renfrew, Easton, Pa., assignors to General Aniline & Film Corporation, New York, N. Y., a corporation of Delaware No Drawing. Application December 30, 1952, Serial No. 328,815

6 Claims. (Cl. 260—373)

The present invention relates to nitroanthraquinone dyestuffs and particularly to a new class of 4-[X-sulfamylanilino]-1,X-dihydroxy-5(or 8)-nitroanthraquinones having new and valuable properties.

A few blue anthraquinone dyestuffs prepared by the condensation of 4,5-dinitrochrysazine or 4,8-dinitroanthrarufin with certain aromatic amines, such as aniline, p-toluidine, and sulfanilamide have been reported in the early art. While the gas fastness of these dyestuffs on acetate rayon was found to be quite good, these compounds suffered from the standpoint of not possessing appreciable affinity for cellulose acetate and hence were not used in the trade. Considerable research has been conducted to find the causes underlying this defect and to eliminate it in its entirety.

We have discovered that by introducing a substituted sulfonamide group in either o-, m-, or p-position of the benzene nucleus of the anilino group attached to the 4-position of either 4,5-dinitrochrysazine or 5,8-dinitroanthrarufin, dyestuffs are obtained which not only dye cellulose acetate and other textile materials, such as "Dacron" and the like, in blue shades but are also extremely fast to light and acidic fumes. The fabrics dyed with such dyestuffs do not fade in color and retain their original shade. This unusual property is evidently enhanced by the presence of the substituted sulfonamide group in the aforestated positions of the anilino group. In other words, the sulfonamide group apparently (a) enhances the substantivity, and (b) increases the ability to resist gas fumes.

The dyestuffs having the foregoing properties are characterized by the following general formula:

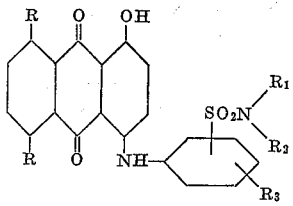

wherein R represents either hydroxy or a nitro group, one of the R's being hydroxy when the other is nitro and vice versa, $R_1$ represents either hydrogen, hydroxyalkoxyalkyl, cyanoalkyl, or a hydroxyalkyl group in which the alkyl groups have from 2 to 3 carbon atoms, $R_2$ represents a hydroxyalkoxyalkyl or hydroxyalkyl group of the same value as $R_1$, and $R_3$ represents either hydrogen or lower alkyl group, such as methyl, ethyl, propyl, and butyl.

The dyestuffs characterized by the foregoing formula are prepared by condensing 4,5-dinitrochrysazine or 4,8-dinitroanthrarufin with amino-N-hydroxyalkylbenzenesulfonamides in the presence of nitrobenzene at a temperature of 160–210° C. for 1 to 9 hours with stirring. The final product is isolated by steam distillation and the residue isolated by filtration. The colors of the dyes range from blue to reddish blue shades and when applied to various fabrics and yarns, the original hue remains unchanged after prolonged exposure to light and gas fumes.

As representative examples of amino-N-hydroxyalkylbenzenesulfonamides which are utilized in the foregoing condensation, the following may be mentioned as illustrative:

$N^1,N^1$-bis(2-hydroxyethyl)metanilamide
$N^1$-(2-hydroxyethyl)metanilamide
$N^1,N^1$-bis(2-hydroxyethyl)sulfanilamide
$N^1$-(2-hydroxyethyl)sulfanilamide
3-methyl-$N^1,N^1$-bis(2-hydroxyethyl)sulfanilamide
2-methyl-$N^1,N^1$-bis(2-hydroxyethyl)sulfanilamide
3-methyl-$N^1$-(2-hydroxyethyl)sulfanilamide
2-methyl-$N^1$-(2-hydroxyethyl)sulfanilamide
6 - amino - N,N - bis(2 - hydroxyethyl) - m - toluenesulfonamide
5-methyl-$N^1,N^1$-bis(2-hydroxyethyl)metanilamide
4-methyl-$N^1,N^1$-bis(2-hydroxyethyl)metanilamide
6-methyl-$N^1,N^1$-bis(2-hydroxyethyl)metanilamide
5-methyl-$N^1$-2-hydroxyethylmetanilamide
4-methyl-$N^1$-2-hydroxyethylmetanilamide
6-methyl-$N^1$-2-hydroxyethylmetanilamide.

Instead of resorting to the foregoing condensation reaction, the dyestuffs of the present invention may be prepared by reacting the 4,5-dinitrochrysazine or 4,8-dinitroanthrarufin containing an anilino or lower alkyl substituted anilino group in the 4-position of said anthraquinone with chlorosulfonic acid followed by treatment of the resulting chloride with alkyl amines or hydroxyalkylamines according to conventional methods.

The following examples will describe the preparation of some of the dyestuffs characterized by the foregoing general formula. It is to be understood that they are merely illustrative and that the invention claimed herein is not to be regarded as restrictive thereto. All the parts given are by weight unless otherwise stated.

*Example 1*

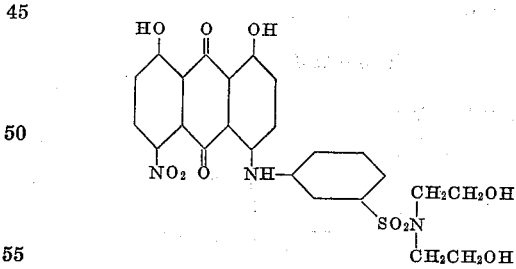

In a suitable vessel equipped with a stirrer, heater, thermometer, and condenser, there were placed 286 parts of $N^1,N^1$-bis(2-hydroxyethyl)metanilamide, 165 parts of 4,5-dinitrochrysazine, and 1500 parts of nitrobenzene. The temperature of the mixture was maintained at 140° C. for 9 hours during which time the mixture was stirred. At the end of the reaction time, the mixture was allowed to cool. Water was added and steam distillation was carried out until all the solvent had been carried away. The residue was isolated by filtration. When applied to acetate rayon by the usual methods, the goods were colored attractive reddish blue shades of good fastness to the usual tests, including washing, exposure to light, and exposure to combustion gas fumes.

Example 2

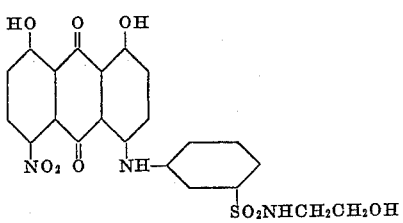

In a suitable vessel, there were placed 83 parts of 4,5-dinitrochrysazine, 119 parts of $N^1$-(2-hydroxyethyl)-metanilamide, and 900 parts of nitrobenzene. The reaction was stirred at the reflux temperature for 6 hours, after which time the product was isolated by the method described in Example 1. The product was slightly redder in shade than the product of Example 1 and had essentially the same dyeing characteristics. The properties of dyed fabrics and yarns were similar to those yielded by the product of Example 1.

Example 3

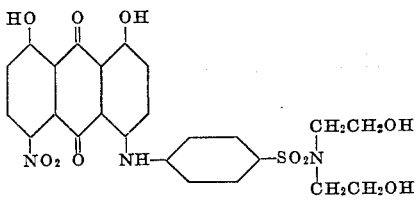

In a suitable vessel, there were placed 75 parts of $N^1,N^1$-bis(2-hydroxyethyl)sulfanilamide, 40 parts of 4,5-dinitrochrysazine, and 480 parts of nitrobenzene. The reaction mixture was maintained at the boiling point of the solvent for 1 hour, after which time the mixture was allowed to cool. Water was added and steam distillation was carried out until all of the solvent had been carried over. The residue was isolated by decantation and the product slurried with dilute aqueous acid, filtered, and washed. The cake was then stirred with 500 parts of an aqueous solution containing 20 parts of sodium carbonate, and 20 parts of sodium bicarbonate. The residue was isolated by filtration, washed neutral, and dried.

Example 4

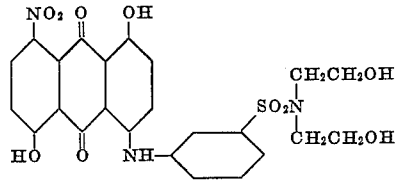

Into a reaction vessel equipped with a stirrer, thermometer, and condenser, there were charged 9.9 parts of 4,8-dinitroanthrarufin, 16 parts of $N^1,N^1$-bis(2-hydroxyethyl)metanilamide, and 60 parts of nitrobenzene. The reaction mixture was heated at 165–170° C. for 7 hours. After cooling, water was added and the solvent was removed by steam distillation and the product was isolated by filtration. The product was purified by suspending it in 60 parts of methanol and warming gently on a steam bath with stirring. After filtering, the product was then suspended in 750 parts of water containing 4 parts of sodium carbonate and 4 parts of sodium bicarbonate. The mixture was stirred for 30 minutes at 95° C. It was then filtered, and the product was washed with hot water. 12.3 parts of product were obtained which dyed acetate rayon in reddish blue shades possessing excellent gas fastness.

Example 5

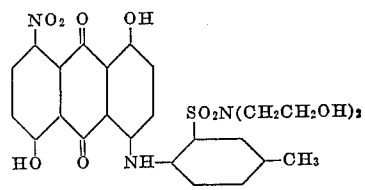

10 parts of 1,5-dihydroxy-8-nitro-4-p-toluino-anthraquinone were added in small portions over a 15 minute interval to 48 parts of chlorosulfonic acid which was cooled externally with an ice water mixture. When this addition was completed, the external cooling was removed, and the reaction mixture was stirred at room temperature for 20 minutes before warming the reaction mixture to 70–75° C. This temperature was maintained for 2 hours. Upon cooling, the reaction mixture was poured slowly and with vigorous stirring into 600 parts of chipped ice. The sulfonyl chloride separated as a solid and was removed by filtration. The product was washed on the filter with cold water until the filtrate was neutral. The moist cake of sulfonyl chloride was then charged into a flask containing 200 parts of acetone and 20 parts of diethanolamine. This suspension was stirred at room temperature for 1 hour, and then the flask was stoppered and allowed to stand at room temperature for 24 hours. The acetone was then removed by distillation and 600 parts of water (50–65° C.) were added to the residue. This mixture was stirred at 70–75° C. for 15 minutes, and it was then filtered at this temperature. The product was washed with warm water until the filtrate was colorless. The product was oven dried and weighed 7.4 parts. This product dyed acetate rayon in blue shades which possessed excellent gas and light fastness.

As many apparently widely different embodiments of this invention may be made without departing from the spirit and scope thereof, it is to be understood that we do not wish to limit ourselves to the specific embodiments thereof except as defined by the appended claims.

We claim:
1. Dyestuffs characterized by the formula selected from the class consisting of the following general formulae:

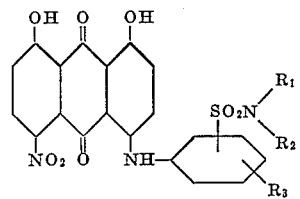

and

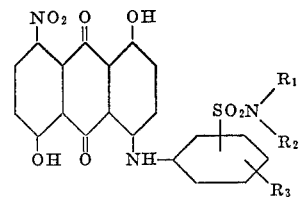

wherein $R_1$ represents a member selected from the class consisting of hydrogen, lower hydroxyalkyl, lower cyanoalkyl, and lower hydroxyalkoxyalkyl groups, $R_2$ represents a member selected from the class consisting of lower hydroxyalkyl and lower hydroxyalkoxyalkyl groups, and $R_3$ represents a member selected from the class consisting of hydrogen and lower alkyl groups.

2. A dyestuff having the following formula:
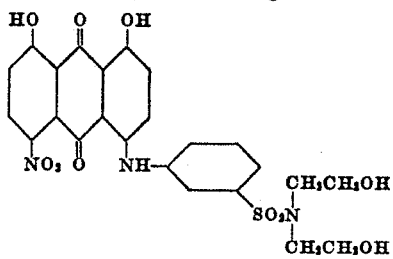
3. A dyestuff having the following formula:
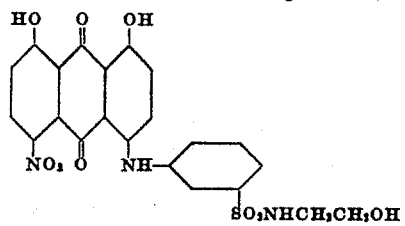
4. A dyestuff having the following formula:
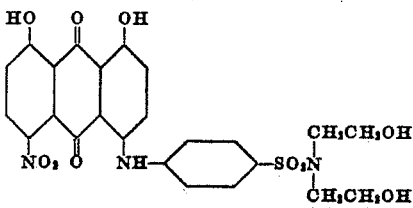
5. A dyestuff having the following formula:
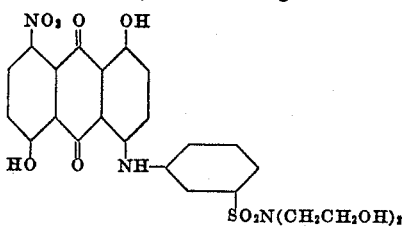
6. A dyestuff having the following formula:
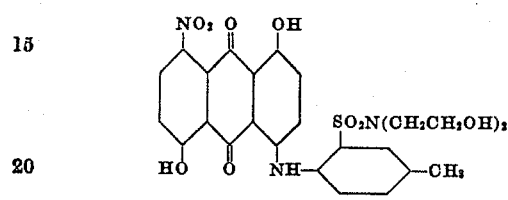
References Cited in the file of this patent
UNITED STATES PATENTS
| | | |
|---|---|---|
| 2,029,258 | Diefenbach et al. | Jan. 28, 1936 |
| 2,430,771 | Kern | Nov. 11, 1947 |
| 2,480,269 | Seymour et al. | Aug. 30, 1949 |